United States Patent
Kowalvk et al.

(10) Patent No.: US 6,588,531 B1
(45) Date of Patent: Jul. 8, 2003

(54) SPLITTER GEARBOX VENT TUBE

(75) Inventors: Vladimir D. Kowalvk, Winnipeg (CA); David Galav, Winnipeg (CA); Richard Vermette, Winnipeg (CA)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 10/041,279

(22) Filed: Jan. 8, 2002

(51) Int. Cl.[7] ............................................... B60K 17/34
(52) U.S. Cl. ....................................................... 180/233
(58) Field of Search ................................. 180/240, 247, 180/248, 339, 53.1, 307, 53.8, 53.6, 242, 344; 74/606 R, 607; 184/1.5, 6.12, 6.13, 6.26, 55.1, 59, 103.1

(56) References Cited

U.S. PATENT DOCUMENTS

| | | | | |
|---|---|---|---|---|
| 3,738,452 A | * | 6/1973 | Hausinger | 184/6.12 |
| 4,235,307 A | * | 11/1980 | Browning et al. | 184/6.12 |
| 6,058,805 A | * | 5/2000 | Merkler | 74/607 |
| 6,223,848 B1 | * | 5/2001 | Young et al. | 180/242 |
| 6,227,326 B1 | * | 5/2001 | Kowalyk et al. | 180/344 |
| 6,230,830 B1 | * | 5/2001 | Chorney et al. | 180/53.6 |
| 6,241,038 B1 | * | 6/2001 | Young et al. | 180/53.8 |
| 6,321,867 B1 | * | 11/2001 | Kowalyk | 180/307 |
| 2003/0006096 A1 | * | 1/2003 | Rimkus et al. | 184/6.12 |

* cited by examiner

*Primary Examiner*—Lesley D. Morris
*Assistant Examiner*—Daniel Yeagley
(74) *Attorney, Agent, or Firm*—John William Stader; A. Nicholas Trausch; Rebecca L. Henkel

(57) ABSTRACT

A vent tube for a splitter gearbox mounted on the rear axle assembly of a four-wheel drive tractor. The vent tube extends into the rear axle assembly, while in fluid flow communication with the lubricating oil in the splitter gearbox, and either breaks a vacuum at a balance hole or permits oil transfer from the splitter gearbox, depending upon which direction the output gears are being driven. The output gears turn at high rpm and cause churning of the oil. The vent tube assembly relieves this condition and thereby significantly reduces parasitic power losses.

14 Claims, 4 Drawing Sheets

SPLITTER GEARBOX VENT TUBE

BACKGROUND OF THE INVENTION

The present invention relates generally to splitter gearboxes used in four-wheel drive agricultural tractors, and more particularly to a vent tube to improve the performance, reliability and durability of such gearboxes.

An integrated splitter gearbox for four-wheel drive tractors is shown and claimed in U.S. Pat. No. 6,230,830 which is incorporated herein fully by reference. Therein is discussed the desirability of integrating all the drives for the input driven components of an articulated four wheel drive tractor into a single gearbox affixed to the rear axle housing of the tractor. The instant invention is an improvement to a splitter gearbox as generally disclosed in the '830 patent.

SUMMARY OF THE INVENTION

Accordingly, one object of the present invention is to provide a vent tube that significantly reduces parasitic losses due to the churning of oil by the output gears of a splitter gearbox.

Another object of the present invention is to provide a novel means for reducing parasitic losses in a splitter gearbox.

It is another object of the instant invention to provide a splitter gearbox with improved operational characteristics and specifications.

Yet another object of the present invention is to provide a vent tube and a non-spring operated poppet check valve assembly that reduces the parasitic losses in a splitter gearbox.

It is yet another object of this invention to provide an improved splitter gearbox for a four wheel drive, hydrostatically driven tractor which is durable in construction, inexpensive of manufacture, carefree of maintenance, facile in assemblage, and simple and effective in use.

It is a still further object of the instant invention to provide a vent tube for a splitter gearbox mounted on the rear axle assembly of a four-wheel drive tractor. The vent tube extends into the rear axle assembly, while in fluid flow communication with the lubricating oil in the splitter gearbox, and either breaks a vacuum at a balance hole or permits oil transfer from the splitter gearbox, depending upon which direction the output gears are being driven. The output gears turn at high rpm and cause churning of the oil. The vent tube assembly relieves this condition and thereby significantly reduces parasitic power losses.

DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT

Figure 1:
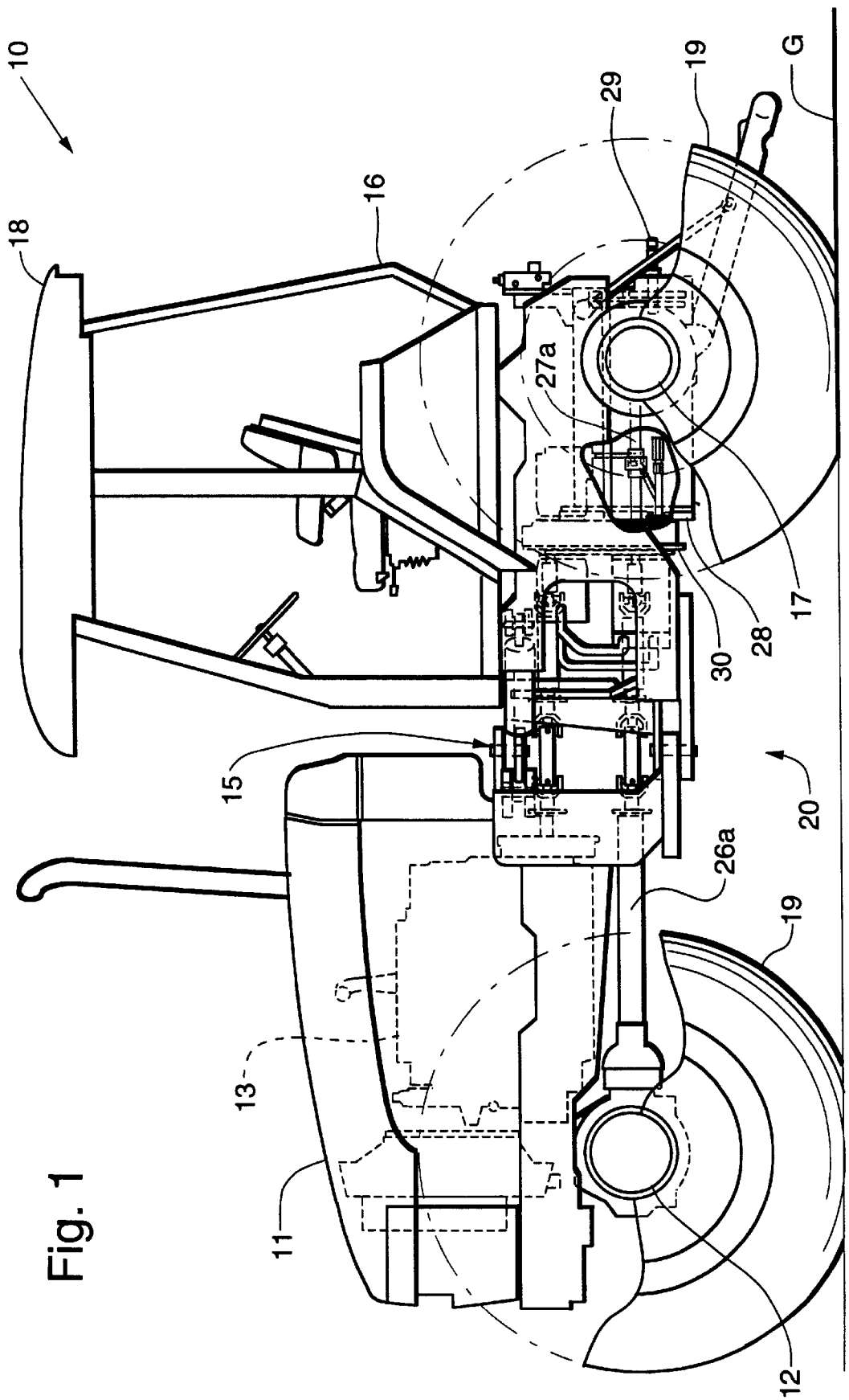
FIG. 1 is a side elevational view of a four wheel drive, articulated tractor incorporating the principles of the instant invention, portions of the tractor being broken away for purposes of clarity.

Referring now to FIG. 1, a four-wheel drive, articulated tractor incorporating the principles of the instant invention can best be seen. The articulated tractor 10 includes a forward engine end 11 supported above the ground G by a front axle assembly 12 and carrying an engine 13. The rearward cab end 16 of the tractor 10 is supported above the ground by a rear axle assembly 17 and has an operator's station 18 mounted thereon. Each of the front and rear axles assemblies 12 and 17 is provided with a pair of opposing wheels 19 for mobile movement of the tractor 10 over the surface of the ground G. An articulation joint 15, the manipulation of which effects steering of the tractor 10 in a known manner, connects the front and rear ends 11 and 16 of the tractor 10.

As best seen in FIGS. 1–5, the tractor 10 is provided with a drive system 20 that is operatively connected to the engine 13 to provide operative power for the front and real axle assemblies 12 and 17. The drive system 20 includes a splitter gearbox 30 mounted on the front of the rear axle assembly 17 in a manner to share the oil sump therewith for lubrication purposes. The drive system 20 also includes the input drive components, including a hydrostatic pump 22 for powering the traction drive of the tractor 10, a hydraulic pump 24 for pressuring the hydraulic system of the tractor 10, and a power takeoff (PTO) mechanism 29; and the output drive components, including a variable displacement hydrostatic motor 25 to provide operative power to both the front and rear axle assemblies 12 and 17 through front and rear output drive shafts 26 and 27.

Figure 5:
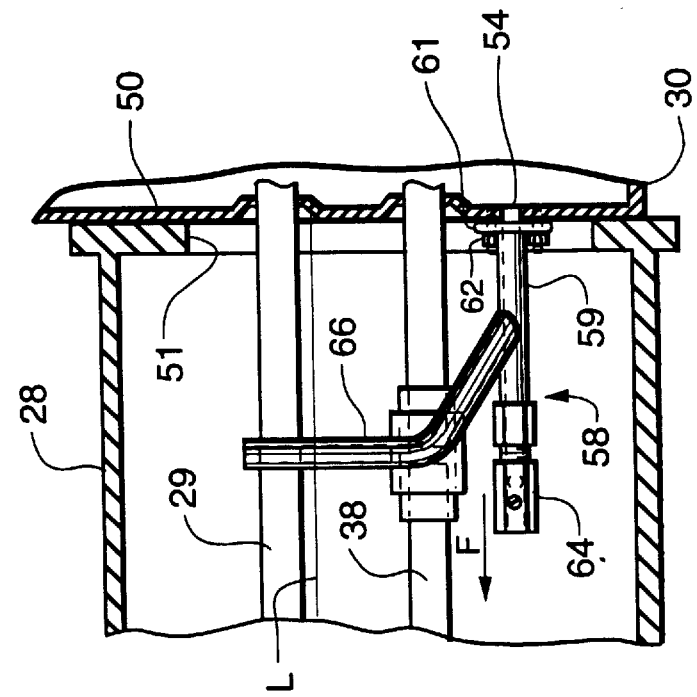
FIG. 5 is a side elevational view of the splitter gearbox, showing clearly the vent tube assembly, corresponding to lines 5—5 of FIG. 3.
Figure 4:
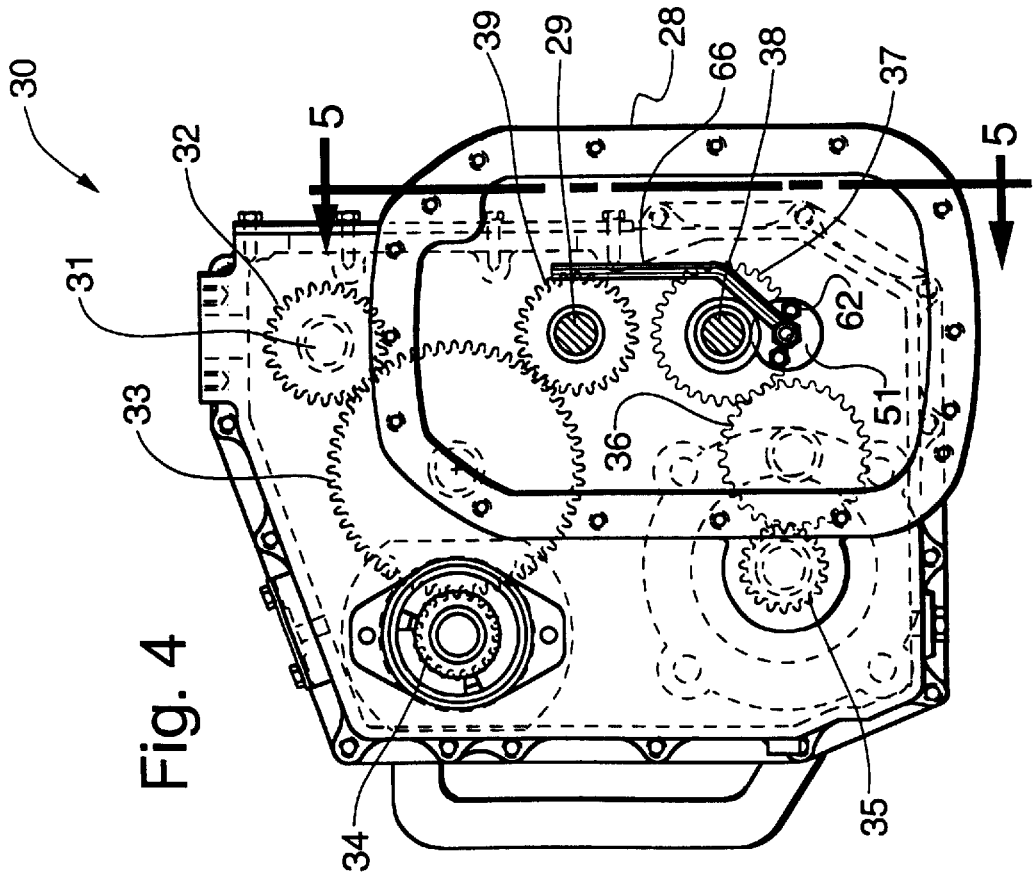
FIG. 4 is a front elevational view of the splitter gearbox and associated drives corresponding to lines 4—4 of FIG. 3.

The splitter gearbox 30 receives rotational power from the engine 13 via a power input shaft 31 interconnecting the engine 13 and the splitter gearbox 30 to rotate the input gear 32. As best seen in FIGS. 4 and 5, the input gear 32 is drivingly engaged with a first idler drive gear 33, the size of the respective gears 32 and 33 being selected to provide the appropriately desire gear reduction. The first idler drive gear 33 is drivingly engaged with a pump drive gear 34 having both the hydrostatic pump 22 and hydraulic pump 24 coaxially mounted therewith, the hydrostatic pump 22 being mounted on the front of the splitter gearbox 30 and the hydraulic pump 24 being mounted on the rear of the splitter gearbox 30. The idler drive gear 33 is also drivingly engaged with the PTO drive gear 39 for powering the PTO mechanism 29 as a direct drive input from the engine 13.

Figure 3:
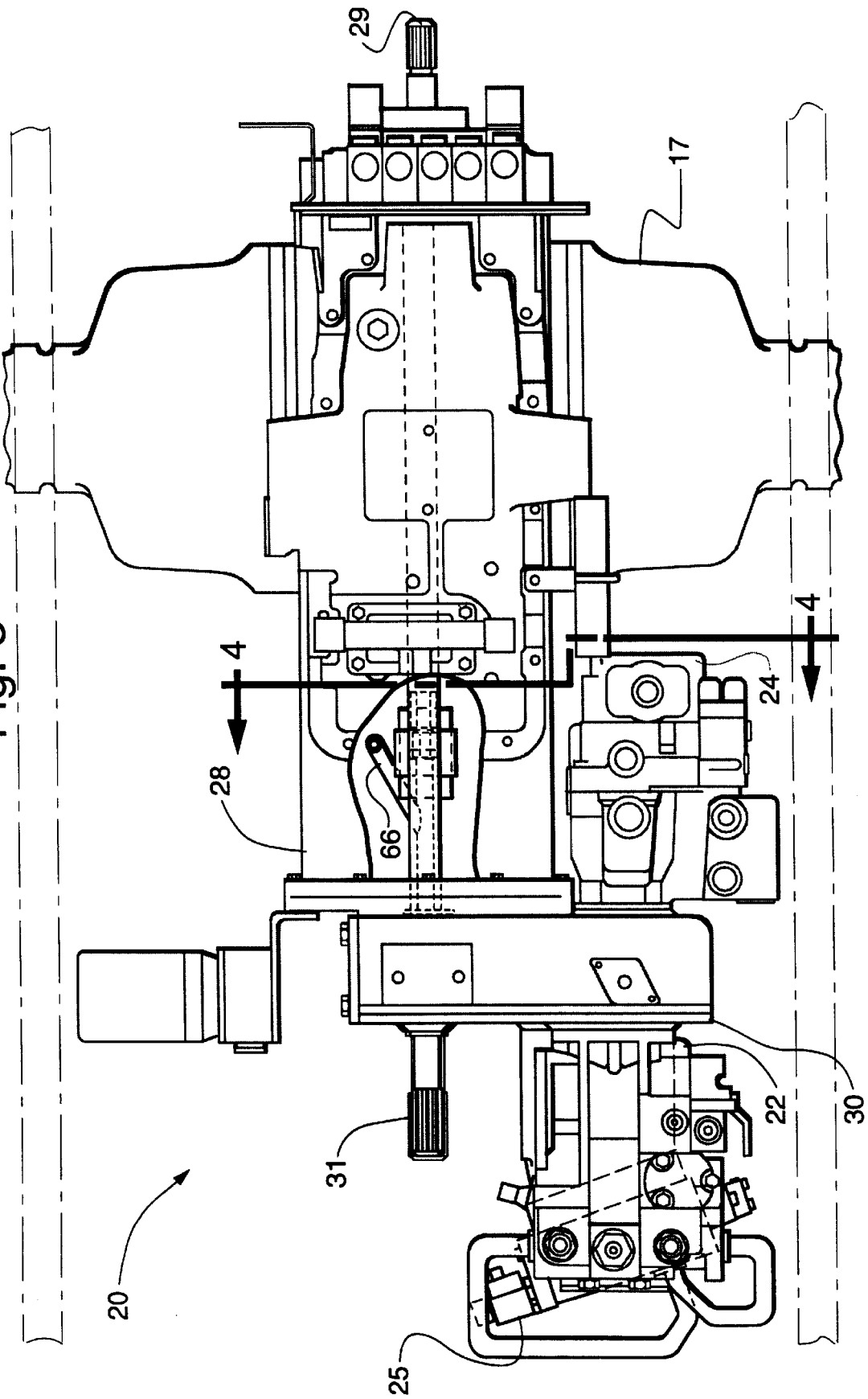
FIG. 3 is a top plan view of the splitter gearbox and rear axle housing corresponding to lines 3—3 of FIG. 2.

As best seen in FIG. 3, the hydrostatic pump 22 is operable to circulate hydraulic fluid under pressure to a variable displacement hydraulic motor 25 mounted on the front of the splitter gearbox 30 below the hydrostatic pump 22 to drive rotation of the hydraulic motor 25. The drive pinion 35 of the hydrostatic motor 25 is drivingly engaged with a second idler gear 36, which is also appropriately sized to provide the desired gear reduction. The second idler gear 36 is drivingly engaged with a traction driven gear 37 having a single shaft 38 extending therethrough to project both forwardly and rearwardly from the splitter gearbox 30 and from the front and rear output drive shafts 26 and 27. Control of the hydrostatic pump is effected through a conventional mechanical linkage.

The hydrostatic motor 25 is preferably set-up with three pre-set, fixed swash plate angles to provide three positive displacements for the motor 25 to proximate a conventional operation of the tractor 10. By utilizing the variable displacement of the hydrostatic motor 25 and/or a variable speed hydrostatic pump 22, the infinite speed adjustment for the tractor 10 can still be attained on-the-go. Using an electronic control system to control the operation of the motor 25, such as by modulating the displacement of the motor 25, and to control the operation of the pump 22, a very smoothly operating power-shift tractor 10 will result without requiring the operator to stop the tractor to change gears in a mechanical transmission, as is conventional. The fixed, pre-set displacements for the hydrostatic motor 25 provide maximum torque and minimum speed at a first position, a mid-range of both torque and speed at a second position, and a minimum torque with maximum speed for roading operations at a third position.

Figure 2:
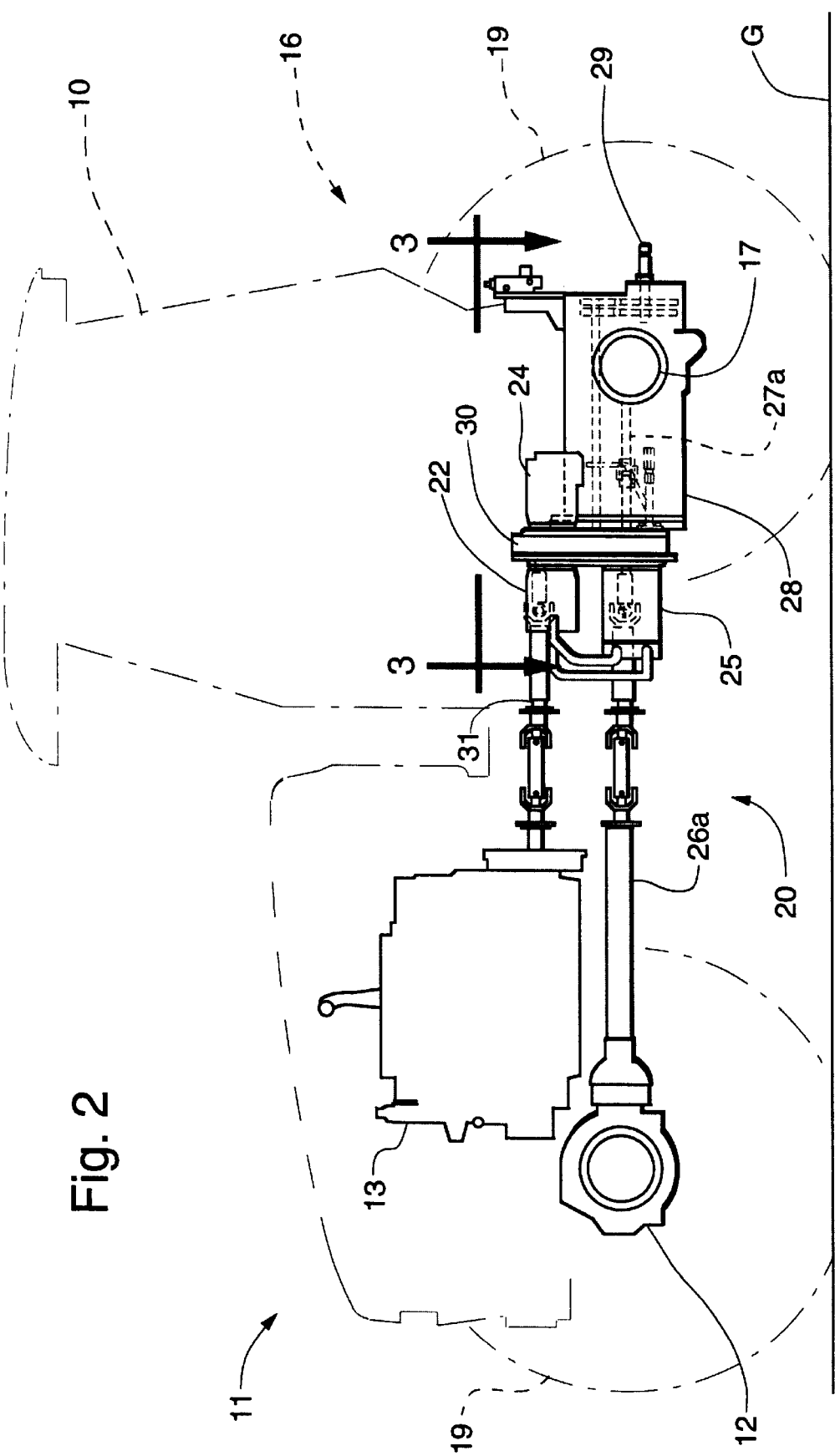
FIG. 2 is a schematic side elevational view of the drive mechanism having a splitter gearbox and associated drives incorporating the principles of the instant invention.

As best seen in FIGS. 1 and 2, the front axle assembly 12 is drivingly connected to the front output drive shaft 26 by a front drive shaft assembly 26a. The rear axle assembly 17 is drivingly connected to the rear output drive shaft 27 by a rear drive shaft assembly 27a passing internally through the housing 28 of the rear axle assembly 17. Likewise, the PTO mechanism 29 is drivingly connected to the PTO drive gear 39 and passes through the housing 28 of the rear axle assembly 17 and projects rearwardly therefrom for remote connection to an apparatus (not shown) for delivering rotational power thereto.

Accordingly, the top portion of the splitter gearbox 30 receives rotational power directly from the engine 13 and drives the input drive train components, including the hydrostatic pump 22, the hydraulic pump 24 and the PTO mechanism 29. The lower portion of the splitter gearbox 30 receives operative power from the hydrostatic motor 25 operatively driven from the hydrostatic pump 22 and delivers the rotational power through the output shafts 26 and 27 to drive the front and rear axle assemblies 12 and 17 from a single hydrostatic motor 25 off of a single gear drive set 35–37.

Referring to FIG. 5, the interface between the rear axle housing 28 and the splitter gearbox 30 can be seen to include a faceplate 50 that, except as described and discussed further below, closes the entire opening 51 between the two. Shafts 29 and 38 extend through faceplate 50 and rotate relative thereto as required in the operation of tractor 10. A balance hole 54 extends through faceplate 50 at the lower portion thereof to help balance the lubricating oil levels in the splitter gearbox 30 and axle housing 28.

Vent tube assembly 58 can best be seen in FIG. 5 as comprising an elongate tube 59 with a flange 61 sealingly affixed to faceplate 50 by bolts 62 over balance hole 54. At the rearward end of the tube 59 is a one-way valve 64 that permits flow only in the direction away from gearbox 30, i.e., in the direction of arrow F. Valve 64 may take any of many forms, but it has been found that a nylon poppet check valve, with no spring, works quite well.

Vent tube assembly 58 includes leg-like extension 66 that extends away from tube 59 and upwardly to a point above the normal oil level of rear axle housing 28, shown as L in FIG. 5. Tubes 59 and 66 are hollow to allow fluid flow therethrough, and the end of tube 59 having flange 61 is aligned with balance hole 54 through faceplate 50. Shafts 29 and 38 are space away from vent tube assembly 58 as can be seen in FIG. 4.

As a matter of clarification, it should be understood that the output gears 36 and 37 rotate at generally high speeds during vehicle transport/roading, in the range of 5,000 rpm. When these gears are rotated in one direction, as they would be when tractor 10 is moving rearward (i.e., to the right in FIGS. 1 and 2), they create a suction, drawing oil into the splitter gearbox from the rear axle that is the hydraulic sump of the vehicle. Too much oil in the splitter gearbox creates churning and constant power losses (parasitic losses). When gears 36 and 37 rotate in the opposite direction, i.e., the tractor is moving forward (i.e., to the left in FIGS. 1 and 2), they create a pumping action and oil is pumped out of the splitter gearbox. Thus, parasitic losses, similar to those described above, are created.

Balance hole 54 is present between the splitter gearbox 30 and the rear axle housing 28 to allow oil to drain from gearbox 30, which is pressure lubed, to the rear axle housing 28. Hole 54 is located at a level where the output gears 36 and 37 mesh. When the tractor 10 is driven forward, the output gears rotate in such a manner as to pump oil from the gearbox 30 into the rear axle through the balance hole. As oil is drawn into the gearbox 30, the level increases, covering the gears and creating high parasitic losses due to churning. The vent tube assembly is mounted such that one end of tube 59 covers the balance hole 54, one end connects to a check valve 64 at the same level as the balance hole, with the free flow direction from the gearbox to the rear axle housing 28, and leg 66 extends above the oil level L of the rear axle.

When the tractor is driven in reverse, the vent tube assembly breaks the vacuum at the balance hole created by the output gears of the splitter gearbox, thereby not allowing oil to be drawn into the splitter gearbox and keeping the parasitic churning losses low. When the tractor is driven in this direction up an incline, the check valve 64 closes off due to the oil level rising in the splitter gearbox 30/rear axle housing 28 junction and the vent tube then breaks the vacuum created by the output gears of the splitter gearbox as above.

When the tractor is driven forward, the check valve allows the oil that is being pumped by the splitter gearbox output gears through the balance hole 54, to be drained into the rear axle, keeping the parasitic churning losses low. An additional balance hole may be added as needed to help with the balancing issue.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. Accordingly, the following claims are intended to protect the invention broadly as well as in the specific form shown.

Having thus described the invention, what is claimed is:

1. In a tractor having a chassis supported by a front axle assembly and a rear axle assembly, an engine for providing operative power for said tractor, a splitter gearbox mounted to said rear axle housing such that the two are generally sealed one from the other from fluid flow, said splitter gearbox being operatively connected to said engine to receive rotational power therefrom and being operatively connected to said front and rear axle assemblies to deliver rotational power thereto for fore-and-aft movement of said tractor, said splitter gearbox and said rear axle assembly each having a normal level of lubricating oil therein, the improvement comprising:

a balancing hole extending between said splitter gearbox and said rear axle assembly to balance the oil levels within the two; and a vent tube assembly including a first tube extending from said balancing hole into said rear axle assembly and terminating with a one-way check valve permitting fluid flow from said splitter gearbox one way into said rear axle assembly, a second tube is connected to and in fluid flow communication with said first tube between said balancing hole and said check valve and extending upwardly and terminating at a location within said rear axle assembly above said normal oil level therein.

2. The improvement of claim 1, wherein:

said first tube is generally parallel to the line of the fore-and-aft movement of said tractor.

3. The improvement of claim 2, wherein:

said check valve is a nylon poppet check valve.

4. The improvement of claim 3, wherein:

said first tube includes a flange at the end thereof adjacent said balancing hole.

5. The improvement of claim 4, wherein:

said splitter gearbox has supported therefrom and provides operative power to a hydrostatic pump providing traction power for powering the front and rear axle assemblies, a hydraulic pump providing hydraulic fluid under pressure to a hydraulic system on said tractor and a power takeoff mechanism.

6. The improvement of claim 5, wherein:

said splitter gearbox further supports a hydrostatic motor and output drives interconnecting said splitter gearbox and said front and rear axle assemblies to provide traction power thereto, said hydrostatic motor being operatively connected to said hydrostatic pump to receive hydraulic fluid under pressure therefrom.

7. The improvement of claim 6, wherein said hydrostatic motor is engaged with an output gear set to transfer rotational power from said hydrostatic motor to both said front and rear axle assemblies.

8. A four-wheel drive tractor comprising:

a chassis supported by a front axle assembly and a rear axle assembly;

an engine for providing operative power for said tractor;

a splitter gearbox mounted to said rear axle housing, said splitter gearbox being operatively connected to said engine to receive rotational power therefrom and being operatively connected to said front and rear axle assemblies to deliver rotational power thereto for fore-and-aft movement of said tractor, said splitter gearbox and said rear axle assembly each having a normal level of lubricating oil therein;

a balancing hole extending between said splitter gearbox and said rear axle assembly to balance the oil levels within the two;

a vent tube assembly including a first tube extending from said balancing hole into said rear axle assembly and terminating with a one-way check valve permitting fluid flow from said splitter gearbox one way into said rear axle assembly;

a second tube in connected to and in fluid flow communication with said first tube between said balancing hole and said check valve and extending upwardly and terminating at a location within said rear axle assembly above said normal oil level therein.

9. The tractor of claim 8, wherein:

said first tube is generally parallel to the line of the fore-and-aft movement of said tractor.

10. The tractor of claim 9, wherein:

said check valve is a nylon poppet check valve.

11. The tractor of claim 10, wherein:

said first tube includes a flange at the end thereof adjacent said balancing hole.

12. A four-wheel drive tractor comprising:

a chassis supported by a front axle assembly and a rear axle assembly;

an engine for providing operative power for said tractor;

a splitter gearbox mounted to said rear axle housing, said splitter gearbox being operatively connected to said engine to receive rotational power therefrom and being operatively connected to said front and rear axle assemblies to deliver rotational power thereto for fore-and-aft movement of said tractor, said splitter gearbox and said rear axle assembly each having a normal level of lubricating oil therein;

said splitter gearbox including a power input shaft delivering rotational power to said splitter gearbox from said engine;

a hydrostatic pump mechanically operatively connected to said power input shaft to receive rotational power therefrom for powering said front and rear axle assemblies;

a hydrostatic motor mounted on said splitter gearbox in flow communication with said hydrostatic pump to receive operative power therefrom;

an output shaft mounted in said splitter gearbox in mechanical communication with said front and rear axle assemblies to effect a driving connection therewith for the purpose of delivering traction power thereto;

a balancing hole extending between said splitter gearbox and said rear axle assembly to balance the oil levels within the two;

a vent tube assembly including a first tube extending from said balancing hole into said rear axle assembly and terminating with a one-way check valve permitting fluid flow from said splitter gearbox one way into said rear axle assembly;

a second tube in connected to and in fluid flow communication with said first tube between said balancing hole and said check valve and extending upwardly and terminating at a location within said rear axle assembly above said normal oil level therein.

13. The tractor of claim 12, wherein:

said splitter gearbox further includes an input gear set associated with said hydrostatic pump to transfer rotational power from said input shaft to said hydrostatic pump and an output gear set associated with said hydrostatic motor to transfer rotational power generated by said hydrostatic motor to said output shaft.

14. The tractor of claim 13, wherein:

said balancing hole is located adjacent said output gear set.

* * * * *

UNITED STATES PATENT AND TRADEMARK OFFICE
CERTIFICATE OF CORRECTION

PATENT NO. : 6,588,531 B1
DATED : July 8, 2003
INVENTOR(S) : Vladimir M. Kowalyk, David Galay and Richard Vermette It is certified that error appears in the above-identified patent and that said Letters Patent is hereby corrected as shown below:

<u>Title page,</u>
Item [75], Inventors, "Vladimir D. Kowalvk" should be -- Vladimir M. Kowalyk -- and "David Galav" should be -- David Galay --.

Signed and Sealed this

Twelfth Day of August, 2003

JAMES E. ROGAN
*Director of the United States Patent and Trademark Office*